(12) United States Patent
Anyuru

(10) Patent No.: US 9,645,837 B2
(45) Date of Patent: May 9, 2017

(54) METHODS FOR COMPILATION, A COMPILER AND A SYSTEM

(71) Applicant: Optis Circuit Technology, LLC, Plano, TX (US)

(72) Inventor: Andreas Anyuru, Lund (SE)

(73) Assignee: OPTIS CIRCUIT TECHNOLOGY, LLC, Plano, TX (US)

( * ) Notice: Subject to any disclaimer, the term of this patent is extended or adjusted under 35 U.S.C. 154(b) by 0 days.

(21) Appl. No.: 14/431,890

(22) PCT Filed: Oct. 25, 2013

(86) PCT No.: PCT/EP2013/072374
§ 371 (c)(1),
(2) Date: Mar. 27, 2015

(87) PCT Pub. No.: WO2014/067866
PCT Pub. Date: May 8, 2014

(65) Prior Publication Data
US 2015/0286491 A1 Oct. 8, 2015

(30) Foreign Application Priority Data
Oct. 29, 2012 (EP) .................................... 12190304

(51) Int. Cl.
G06F 9/455 (2006.01)
G06F 9/45 (2006.01)

(52) U.S. Cl.
CPC .............. *G06F 9/4552* (2013.01); *G06F 8/48* (2013.01)

(58) Field of Classification Search
CPC .................................. G06F 8/48; G06F 9/4552
USPC .......................................................... 717/148
See application file for complete search history.

(56) References Cited

U.S. PATENT DOCUMENTS

| 7,426,721 B1 * | 9/2008 | Saulpaugh | H04L 67/16 717/143 |
| 8,850,410 B2 * | 9/2014 | Burugula | G06F 9/00 712/208 |
| 2005/0155026 A1 * | 7/2005 | DeWitt, Jr. | G06F 8/443 717/158 |

(Continued)

OTHER PUBLICATIONS

Anonymous, "Buffered profiling approach for dynamically compiled code", IP.com Document No. 000214127, Jan. 13, 2012, 4pg.*

(Continued)

*Primary Examiner* — Ryan Coyer
(74) *Attorney, Agent, or Firm* — The Danamraj Law Group, P.C.; Thomas L. Crisman; Kenneth A. McClure (57) ABSTRACT

A method in a Just-In-Time, JIT, compiler for compiling code in a JIT-compiler for a heterogeneous multiprocessor system is provided. The method comprises compiling a snippet of input code, whereby one or more compiled code snippets are generated for the snippet of input code. The one or more compiled code snippets are tagged with one or more snippet specific characteristics. One or more compiled code snippets are selected from the compiled code snippets, based on said snippet specific characteristics. The one or more selected compiled code snippets are executed on one or more of the plurality of processors. While executing, run-time data is gathered, where the gathered data is tagged for which processor in the heterogeneous multiprocessor system it is related to.

19 Claims, 5 Drawing Sheets

(56) References Cited

U.S. PATENT DOCUMENTS

| | | | | |
|---|---|---|---|---|
| 2010/0153934 A1* | 6/2010 | Lachner | ............... | G06F 8/45 717/146 |
| 2014/0082597 A1* | 3/2014 | Chafi | ............... | G06F 8/443 717/148 |
| 2014/0247887 A1* | 9/2014 | Brueck | ............... | H04N 19/40 375/240.26 |

OTHER PUBLICATIONS

Auerbach et al., "Lime: a Java-Compatible and Synthesizable Language for Heterogeneous Architectures", ACM, 2010, 20pg.*
Eichenberger et al., "Optimizing Compiler for a Cell Processor", IEEE, 2005, 12pg.*
Silberman et al., "Architectural Architectural Framework for Supporting Heterogeneous Instruction-Set Architectures", IEEE, 1993, 18pg.*
International Search Report issued in corresponding International application No. PCT/EP2013/072374, date of mailing of the search report Feb. 7, 2014.
Written Opinion of the International Searching Authority issued in International application No. PCT/EP2013/072371, date of mailing Feb. 7, 2014.
Fursin, Grigori et al., "A Practical Method for Quickly Evaluating Program Optimizations," First International Conference on High-Performance Embedded Architectures and Compilers, Barcelona, Spain, Nov. 17-18, 2005, pp. 29-46, XP019024254, ISBN: 978-3-540-30317-6.

\* cited by examiner

METHODS FOR COMPILATION, A COMPILER AND A SYSTEM

TECHNICAL FIELD

Embodiments herein relate to a method in a heterogeneous multiprocessor system comprising a Just-In-Time, JIT, compiler for compiling code. The system comprises a plurality of processors for executing code. The method comprises compiling one snippet of input code, whereby one or more compiled code snippets are generated for the snippet of input code, and wherein each respective of the one or more compiled code snippets corresponds to the one snippet of input code. Further embodiments herein relate to a method in a JIT compiler, to a JIT compiler, to a system and to a computer program product for compilation for a multiprocessor system.

BACKGROUND

In many computer systems including mobile electronic devices such as mobile phones and tablets, Symmetric Multiprocessing (SMP) are common. An SMP system is a computer hardware architecture where multiple identical processors, sometimes called cores in an SMP system, are connected to a single shared main memory. Since the processors are identical the system may have a single instance of an Operating System (OS) with a scheduler scheduling a number of tasks on the identical processors. If load balancing between the processors is disregarded, it does not matter which processor the scheduler schedules a task on since the processors are identical.

Power consumption is a very important characteristic for mobile electronic devices. Hence different strategies to save power have evolved. For example Dynamic Voltage Frequency Scaling (DVFS) where the voltage and the frequency for a processor is changed dynamically in run-time allow the system to decrease voltage and frequency in order to save power when less performance is needed by a system. As an example, a user of a mobile electronic device is only reading email which is typically a task that does not require much performance from the system. Central Processing Unit (CPU) hotplug is another example of a power save technique for SMP systems where a processor may be powered off completely.

To meet the demand for even higher-performance mobile platforms and at the same time being power efficient when the user is performing tasks that require less performance, heterogeneous multi-core systems where high performance but less power efficient processors are paired with smaller, power efficient processors delivering less performance have been investigated. An example of such a system is the company ARM's big.LITTLE.

The first big.LITTLE system from ARM uses a "big" Cortex-A15 processor, which is a high performance processor, paired with a "LITTLE" Cortex-A7 processor, which is a power efficient processor. Both the smaller Cortex-A7 and the larger Cortex-A15 use the same instruction set and binary code built for the Cortex-A7 may execute on the Cortex-A15 and the other way around. There may be different variations of how many Cortex-A15 processors and how many Cortex-A7 processors that are used. A common configuration may be to have two Cortex-A15 processors paired with two Cortex-A7 processors.

Even if an instruction set is the same between the different processors in a heterogeneous multi-core system the microarchitecture may be very different. Examples of characteristics that often differ between the processors are instruction and data cache sizes, length of pipeline, branch prediction characteristics, if the processor may execute instructions out-of-order or not and a number of other digital circuits in the processors. For example a big processor might have several Arithmetic and Logic Units (ALUs) and Floating Point Units (FPUs) while the small processor might only have one. Another difference may be number of entries in the Translation Lookaside Buffer (TLB).

Today many runtime environments use Just-in-Time (JIT) compilation where code is compiled to native machine code in run-time just before it is executed on a processor. Such environments are for example Google's Android for mobile devices where all applications are compiled to native machine code in runtime by the Dalvik Virtual Machine (VM) most JavaScript implementations used in client side web browsers such as Google Chrome or Firefox both for PCs, laptops, Android smartphones and tablets, and Microsoft's .NET Framework.

A strategy that a JIT compiler may use to balance the requirement for short compilation and at the same time do optimizations so the code may run faster is to first compile all the code as quickly as possible without spending too much time trying to do any optimizations. Then when the compiled code is executed the binary is profiled to identify some hot parts of the code that are executed frequently and compile these hot parts again but this time trying to optimize the code more. An example of this is the latest version of Google's V8 JavaScript engine (http://blog.chromium.org/2010/12/new-crankshaft-for-v8.html) which is used in e.g. Android on ST-Ericsson, Qualcomm, TI, Samsung and other chipset vendor's products. Here JavaScript code is first compiled as quickly as possible without doing too much optimizations. Then the binary is profiled in run-time to identify which parts of the code that are executed many times. These portions are often referred to as hot spots. Then the V8 JavaScript engine performs a second compilation pass and this time it spends extra time trying to optimize the hot spots.

SUMMARY

An object of embodiments herein is to improve performance of a multi-processor system. According to a first aspect, the object is achieved by a method in a heterogeneous multiprocessor system comprising a Just-In-Time, JIT, compiler for compiling code, and comprising a plurality of processors for executing code. The method comprises compiling one snippet of input code, whereby one or more compiled code snippets are generated for the snippet of input code, and wherein each respective of the one or more compiled code snippets corresponds to the one snippet of input code. The method further comprises tagging the one or more compiled code snippets with respective one or more snippet specific characteristics, selecting one or more compiled code snippets from the one or more compiled code snippets, based on said snippet specific characteristics, executing the one or more selected compiled code snippets on one or more of the plurality of processor. While executing, run-time data is gathered, the gathered run-time data is tagged for which processor in the heterogeneous multiprocessor system it is related to.

In other embodiments, methods herein further comprises further tagging the one or more executed compiled code snippets with the gathered run-time data, re-compiling one or more of the executed compiled code snippets based on the tagging or further tagging and the gathered runtime data to generate one or more re-compiled code snippets, re-selecting one or more re-compiled code snippets from the re-compiled code snippets, based on said snippet specific characteristics and on said gathered run-time data, re-executing one or more selected compiled code snippets on one or more of said plurality of processors. By selecting and executing code snippets in this way, enabling use of run-time data as input to the JIT compilation process, the proposed method results in a more efficient native machine code that executes faster, and is more power efficient compared to conventional methods for executing code in a JIT-compiler. Since code is executed in a more power efficient way, a result is longer battery life for a mobile battery powered device using the method. Alternatively, a smaller battery may be used which could result in a lighter device. Since code snippets are selected in run-time it is possible to select the most efficient code snippet for the current conditions, e.g. which processor in the heterogeneous multi-processor system the code is currently executed on. As a result, the program that the JIT compiler executes will be executed faster. Further, instead of executing faster on a given computer system with a specific specification related to performance, e.g. size of caches, size of TLBs, frequency of processors, efficiency of processor pipeline, etc, with the proposed method it is possible to gain the same executing time for a computer system with simpler and therefore cheaper specification, e.g. smaller caches, smaller TLB, lower frequency on processors and less efficient processor pipeline.

In other embodiments, in the action executing, methods herein further comprises identifying one or more code sections executed a plurality of times.

In other embodiments, in any of the selection actions, selection is further based on which processor the code currently executes on.

In other embodiments, in the step of executing, run-time data is gathered by use of one or more hardware performance counters.

In other embodiments, in the step of executing, run-time data comprises bandwidth load measurements.

According to another aspect a method in a Just-In-Time, JIT, compiler for compiling code for a heterogeneous multiprocessor system comprising a plurality of processors is provided. The JIT compiler is associated with the heterogeneous multiprocessor system. The method comprises compiling one snippet of input code, whereby one or more compiled code snippets are generated for the snippet of input code, and wherein each respective of the one or more compiled code snippets corresponds to the one snippet of input code. The method further comprises tagging the one or more compiled code snippets with respective one or more snippet specific characteristics, and selecting one or more compiled code snippets to be executed from the one or more compiled code snippets, based on said snippet specific characteristics.

In other embodiments, methods herein further comprises further tagging the one or more executed compiled code snippets with gathered run-time data after the code has been executed on one of the processors, re-compiling one or more of the executed compiled code snippets based on the tagging or further tagging and the gathered runtime data to generate one or more re-compiled code snippets, re-selecting one or more re-compiled code snippets to be executed from the re-compiled code snippets, based on said snippet specific characteristics and on said gathered run-time data.

In other embodiments, in any of the selection actions, selection is further based on which processor the code currently executes on.

In another aspect a Just-In-Time, JIT compiler compiling code for a heterogeneous multiprocessor system is provided. The JIT compiler is associated with the heterogeneous multiprocessor system comprising a plurality of processors, and the JIT compiler is adapted to compile one snippet of input code, whereby one or more compiled code snippets is generated for the snippet of input code. Each respective of the one or more compiled code snippets corresponds to the one snippet of input code. The compiler is adapted to tag the one or more compiled code snippets with one or more snippet specific characteristics, select one or more compiled code snippets from the compiled code snippets, based on said snippet specific characteristics, and execute the one or more selected compiled code snippets on one or more of the plurality of processors. While executing, run-time data is gathered, where the gathered run-time data is tagged for which processor in the heterogeneous multiprocessor system it is related to.

In other embodiments, the JIT compiler is further adapted to further tag the one or more executed compiled code snippets with the gathered run-time data, re-compile one or more of the executed compiled code snippets based on the tagging, the further tagging and the gathered runtime data to generate one or more re-compiled code snippets, select one or more re-compiled code snippets from the re-compiled code snippets, based on said snippet specific characteristics and on said gathered run-time data, re-execute the one or more selected compiled code snippets on one or more of said plurality of processors.

In still other embodiments, the JIT compiler is further adapted to tag each of the identified one or more code sections executed a plurality of times with a respective identity identifying which one out of the plurality of processors it was generated for.

In other embodiments, the JIT compiler is further adapted to select code snippet based on which processor that the code currently executes on.

In other embodiments, the JIT compiler is further adapted to gather run-time data by use of one or more hardware performance counters.

In other embodiments, the JIT compiler is further adapted to gather bandwidth load measurements. Thus, methods disclosed herein may use values from bandwidth load measurements for compiling code for a multi-processor system. Since the method takes bandwidth load into account when selecting the most efficient code snippet for the current conditions, it is possible to select a code snippet in the JIT compiler that generates lower bandwidth load on the system bus in cases where the current condition already show that there is a high load on the system bus. Thereby, more available bandwidth for the rest of the IP-blocks connected to system bus.

In another aspect, a heterogeneous multiprocessor system comprising a Just-In-Time, JIT, compiler for compiling code is provided. The system comprises a plurality of processors and is adapted to compile one snippet of input code, whereby one or more compiled code snippets is generated for the snippet of input code, each respective of the one or more compiled code snippets corresponds to the one snippet of input code. The system is adapted to tag the one or more compiled code snippets with one or more snippet specific characteristics, select one or more compiled code snippets from the compiled code snippets, based on said snippet specific characteristics, and execute the one or more selected compiled code snippets on one or more of the plurality of processors. While executing, run-time data is gathered, where the gathered run-time data is tagged for which processor in the heterogeneous multiprocessor system it is related to.

In other embodiments, the heterogeneous multiprocessor system is further adapted to further tag the one or more executed compiled code snippets with the gathered run-time data, re-compile one or more of the executed compiled code snippets based on the tagging, the further tagging and the gathered runtime data to generate one or more re-compiled code snippets. The system is further adapted to select one or more re-compiled code snippets from the re-compiled code snippets, based on said snippet specific characteristics and on said gathered run-time data, and re-execute the one or more selected compiled code snippets on one or more of said plurality of processors.

In other embodiments, the heterogeneous multiprocessor system is further adapted to tag each of the identified one or more code sections executed a plurality of times with a respective identity identifying which one out of the plurality of processors it was generated for.

In other embodiments, the heterogeneous multiprocessor system is further adapted to select code snippet based on which processor that the code currently executes on.

In other embodiments, the heterogeneous multiprocessor system further comprises one or more hardware performance counters, and wherein the system is further adapted to gather run-time data by use of the one or more hardware performance counters.

In other embodiments, the heterogeneous multiprocessor system is further adapted to gather bandwidth load measurements.

In still another aspect, a computer program product for compilation for a multi-processor system is provided. The computer program product comprises a computer readable storage medium having computer readable program code embodied therein, and the computer readable program code is configured to carry out one or more of the methods herein.

According to some other embodiments described herein, a system compiling code for a multi-processor system in at least two phases is provided. According to still further embodiments, methods for compiling code in at least two phases for a multi-processor system are provided.

BRIEF DESCRIPTION OF THE DRAWINGS

Examples of embodiments herein are described in more detail with reference to attached drawings in which.

DETAILED DESCRIPTION

As part of developed embodiments herein, a problem will first be identified and discussed. One advantage with Just-in-Time compilation method is that runtime characteristics of a particular program that is executed by a virtual machine may be taken into account when native machine code is generated. It is also important to note that since the compilation happens in run-time, just before the code will be executed, the compilation time is much more important than when compiling a traditional C or C++ programs with a traditional static compiler such as GCC. Since the compilation time is critical for a Just-in-Time compiler there is less time available for the Just-in-Time compiler to do advanced optimizations that speed up the execution time. Even if advanced optimizations may speed up the execution time, they often take longer time to perform during the compilation so when considering the total compilation time plus the execution time it is not always efficient to do too advanced compilation optimizations in a JIT compiler.

A JIT compiler that makes use of profiling information is actually taking program properties, e.g. how often specific blocks or methods are executed, into account. However, with just profiling information it cannot normally take into account information from the hardware architecture such as cache misses, pipeline stalls, TLB misses, etc. To take advantage of hardware architecture events such as cache misses, pipeline stalls, TLB misses, information from hardware performance counters may be used to guide the compiler. Hardware performance counters are available in most modern CPUs.

In a multi-processor system based on SMP, or a single processor system, where all processors are identical including same cache sizes, pipeline lengths, branch characteristics, etc. it will matter less on which processor the different tasks are executed as long as the work is approximately evenly distributed over the available processors. In a heterogeneous multi-core processor system where different processors in the system may have very different characteristics, different tasks are more or less suitable for the different processors. Even if it is possible to execute all type of tasks on all processors if the instruction set is the same this is not optimal. For example, a task which consists of code that has a lot of branches will typically execute less well on a processor with less advanced branch prediction logic or a processor with high penalty for branch prediction misses. Another situation is a task that performs a lot of memory accesses. Such a task or process will usually benefit more from running on a processor with a large and fast cache. Thus, a JIT compiler compiling code for a multi-core processor system need to compromise if produced binary code should work well on all type of processors present in a heterogeneous multi-processor system. If run-time information, like performance counters, is used as input to the JIT compiler this run-time information is only accurate for the processor where it is measured.

Embodiments herein will now be exemplified in the following detailed non-limiting description.

Figure 1:
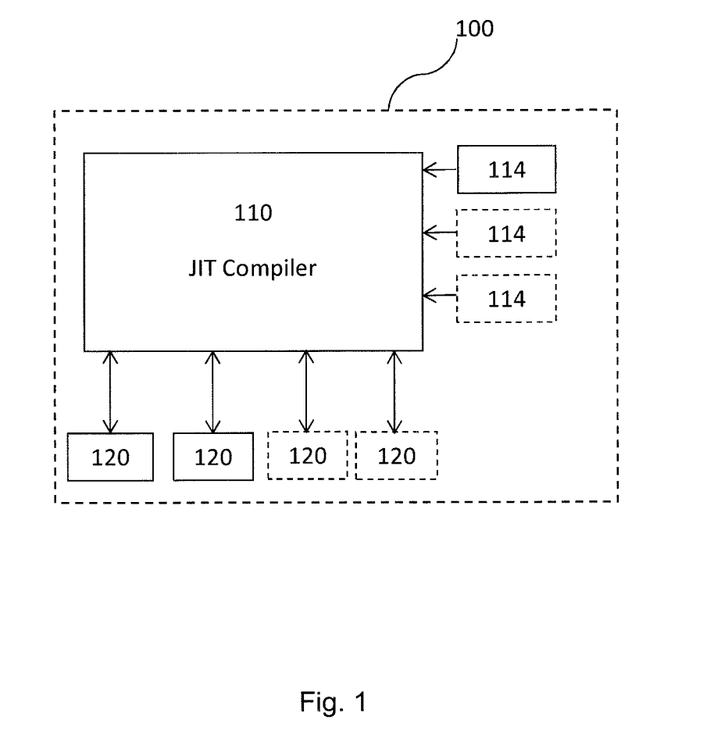
FIG. 1 is a block diagram showing a system with a JIT compiler according to embodiments herein.

FIG. 1 schematically illustrates a heterogeneous multi-processor system 100. A Just-In-Time, JIT, compiler 110 is adapted to compile code for the heterogeneous multiprocessor system 100. The JIT compiler 110 comprises a processing unit 420 adapted to compile code by selecting a compiled code snippet for a snippet of input code. The JIT compiler 110 is associated with the heterogeneous multi-processor system 100 comprising a plurality of processors 120, 122, and the processing unit 420 is adapted to compile the snippet of input code, whereby one or more compiled code snippets are generated for the snippet of input code. Each respective of the one or more compiled code snippets corresponds to the one snippet of input code.

The processing unit 420 is further adapted to tag the one or more compiled code snippets with one or more snippet specific characteristics, select one or more compiled code snippets from the compiled code snippets, based on said snippet specific characteristics, and to execute the one or more compiled code snippets on one or more of the plurality of processors 120, 122. While executing, run-time data is gathered. The processing unit 420 is further adapted to, where the gathered data is tagged for which processor 120, 122 in the heterogeneous multiprocessor system 100 it is related to, further tag the one or more executed compiled code snippets with the gathered run-time data, re-compile one or more of the executed compiled code snippets based on the tagging, the further tagging, and the gathered runtime data to generate one or more re-compiled code snippets, select one or more re-compiled code snippets from the re-compiled code snippets, based on said snippet specific characteristics and on said gathered run-time data, and to re-execute the one or more selected compiled code snippets on one or more of said plurality of processors 120, 122.

The processing unit 420 may further be adapted to gather run-time data by use of one or more hardware performance counters 104 comprised in the system 100. The processing unit 420 may also be adapted to gather bandwidth load measurements. Since run-time information such as measured performance counter 104 values and the bandwidth load measurements may be done on a specific processor 120, 122 in the heterogeneous multi-processor system, the JIT compiler 110 is able to generate compiled code, several native machine code snippet versions for the same input code snippet. All the different native machine code snippets are tagged with properties that identifies under which conditions the specific native machine code snippet is executed most efficiently. The most important property that a native machine code snippet is tagged with is which processor 120, 122 in the heterogeneous multi-processor system the native machine code snippet is generated for. Another property is if the native machine code snippet is specifically suitable in a case where there is a low, or high, bandwidth load on the system bus. For example if the JIT compiler 110 produces two different native machine code snippets for the same input code and one of the native machine snippets contains many additional memory accesses to read or write data, this native machine code snippet could be tagged with the property that it is less suitable in a case where the bandwidth load on the system bus is high.

Figure 2:
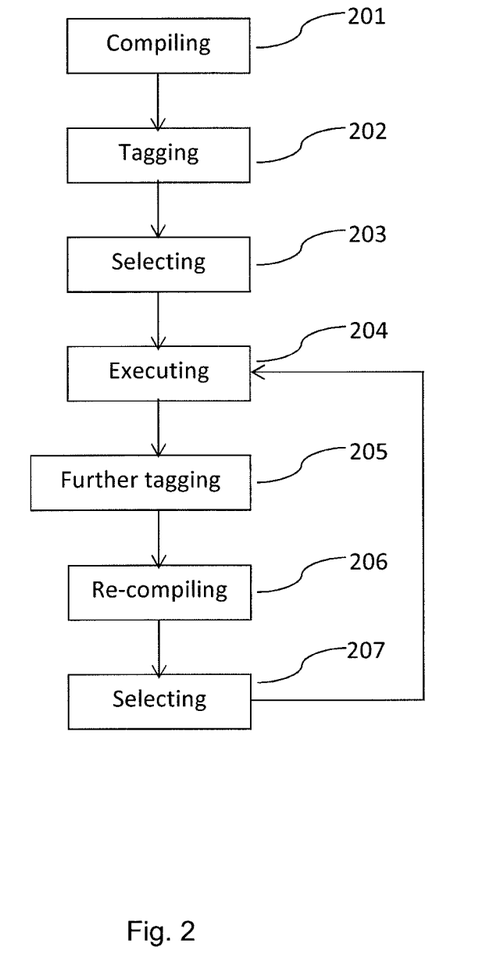
FIG. 2 is a flow chart over methods described herein.

With reference to FIG. 2, a method in method in a Just-In-Time, JIT, compiler 110 adapted to efficiently execute code for a heterogeneous multiprocessor system 100 will now be described. As mentioned above the JIT compiler 110 is associated with a heterogeneous multiprocessor system 100 comprising a plurality of processors 120, 122. The method selects a native machine code snippet for a snippet of input code. Input code may for example be given by a user of the heterogeneous multiprocessor system 100.

Action 201

The JIT compiler compiles the snippet of input code, whereby one or more alternative compiled code snippets is generated for the snippet of input code.

Action 202

The JIT compiler tags one or more compiled code snippets with one or more snippet specific characteristics. Thereby, compiled code snippets are tagged with static characteristics, known from start.

Action 203

One or more compiled code snippets are selected from the alternative versions of code snippets, based on said static snippet specific characteristics.

Action 204

The one or more selected code snippets are executed on one or more of the plurality of processors 120, 122. While executing, run-time data is gathered, where the gathered data is tagged for which processor 120, 122 in the heterogeneous multiprocessor system 100 it is related to. During execution of the generated native machine code snippets the JIT compiler 110 may use the run-time information such as which processor 120 in the heterogeneous multi-processor system that is executing the native machine code snippet and/or the current bandwidth load on the system bus to in run-time select the most efficient native machine code snippet.

Action 205

The one or more executed code snippets are further tagged with the gathered run-time data.

Action 206

One or more of the executed code snippets is re-compiled based on the tagging and the gathered runtime data to generate one or more alternative versions of re-compiled code snippets.

Action 207

One or more efficient re-compiled code snippets are selected from the alternative versions of the code snippets, based on said snippet specific characteristics and on said gathered run-time data.

The one or more selected native machine code snippets are re-executed under action 204 on one or more of said plurality of processors 120, 122.

In other embodiments, the executing further comprises identifying one or more code sections executed a plurality of times. In other embodiments, in the executing, run-time data is gathered by use of one or more hardware performance counters 104.

In still other embodiments, in executing, run-time data comprises bandwidth load measurements. In other embodiments, the JIT compiler 110 is further adapted to gather bandwidth load measurements. Further, values from bandwidth load measurements, for example performed by SBAG, may be used to make efficient decisions of which native machine code to generate. Bandwidth utilization measurement hardware block may be used for this purpose. As examples such blocks may be as SBAG in ST-Ericsson U8500, L8540 and L8680 platforms, which optionally may be used to make still further efficient decisions for a second phase of the JIT compilation. Bandwidth load measurements may as well be used in multi-processor systems with identical processors 120 or processors 122 as well as in multi-processor systems with different type of processors 120, 122. The reason that another possible input, bandwidth load on the system bus, may be important when selecting native machine code snippet is that the JIT compiler 110 might have a possibility to choose between two different strategies when generating the binary code. One of the strategies might be more advantageous if the other IP-blocks such as e.g. a Graphic processing Unit (GPU) hardware video decoders, 2D graphic engines or modem hardware accelerators connected to the main interconnect do not generate much traffic on the bus to the system memory. The other strategy might be better if there are high load from other IP-blocks to the system memory. An example of when this latter case with the bandwidth on the system bus is important is if the JIT compiler when generating the binary code for a certain function notice that it has two options. It may either generate a LookUp Table (LUT) or it may calculate the values each time the function is called. If the LUT is large so it occupies a large amount of memory it will probably not fit well in the caches. Still if the function is very complex to calculate, the LUT might be more efficient if the bandwidth load on the main memory is low. On the other hand if the bandwidth load on the main memory is high, it is better for the JIT compiler to choose the native machine code snippet that actually calculates values in run-time instead of using the lookup table which will result in even higher memory bandwidth load.

In other embodiments, the JIT compiler is further adapted to gather run-time data by use of one or more hardware performance counters 104. When hardware performance counters 104 are used as input to the compilation the values measured by the hardware performance counters 104 are mostly relevant on the measured processor 120, 122. For example if a specific hardware performance counter 104 measuring cache misses are used as input when JIT compiling for a "LITTLE" processor 122 in a heterogeneous multi-processor system the native machine code snippet that is produced by the JIT compiler is not optimal for the "big" processor 120, since it was not compiled for this processor and the two processors 120, 122 may have very different cache characteristics.

In other embodiments, the selection is further based on which processor 120, 122 the code currently executes on.

In other embodiments, the JIT compiler 110 is further adapted to tag each of the identified one or more code sections executed a plurality of times with a respective identity identifying which one out of the plurality of processors 120, 122 it was generated for.

In other embodiments, the JIT compiler 110 is further adapted to select code snippet based on which processor 120, 122 that the code currently executes on.

Figure 4:
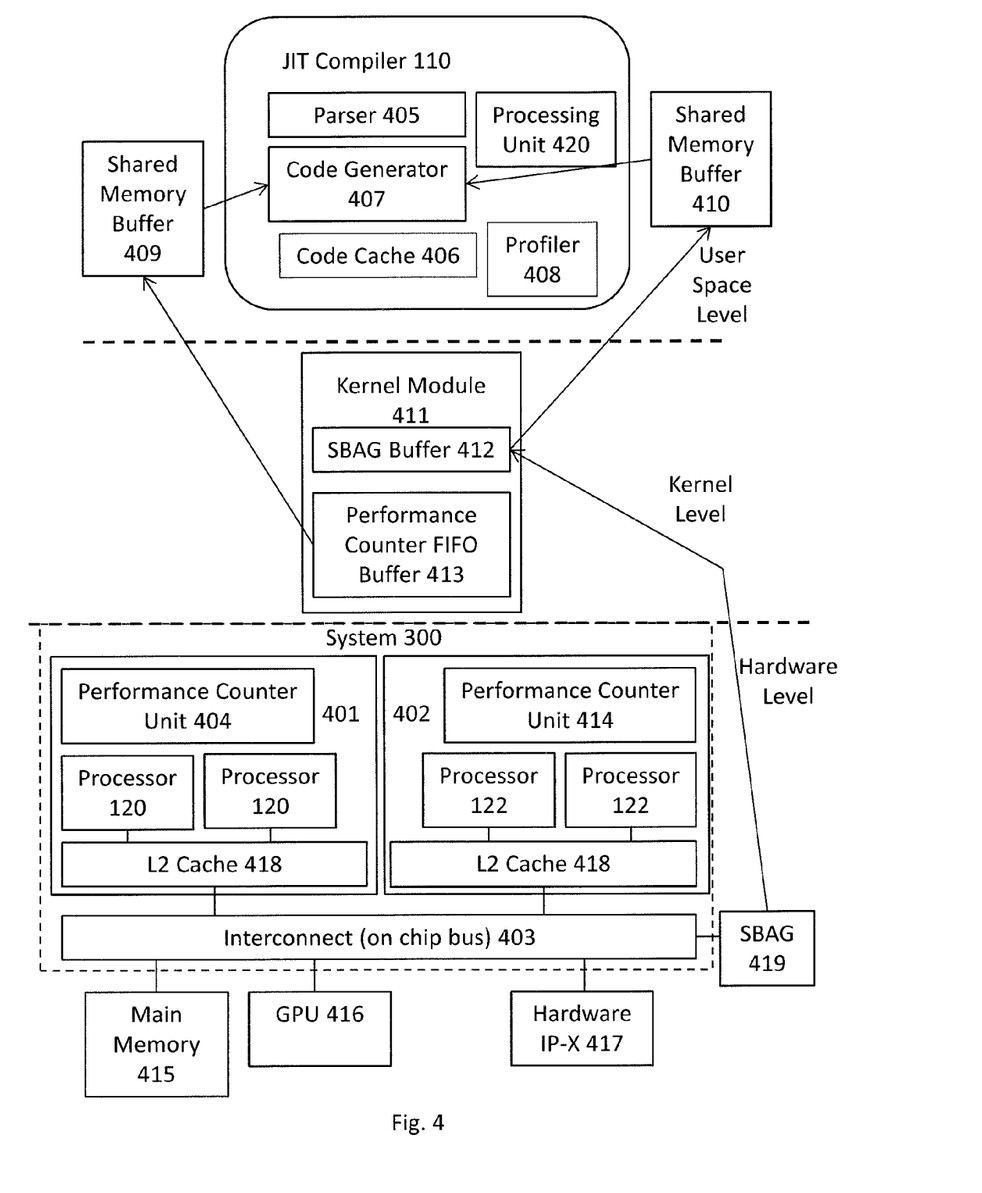
FIG. 4 is an overview of a System on Chip, SoC, with two processor clusters and a JIT compiler system.

According to some embodiments described herein, a JIT compiler system 100 compiles code in several phases. In a first basic phase a JIT compilation is done as fast as possible without any optimizations that take any longer time. When the JIT compiled native code is executed it is at the same time profiled with a profiler 408 located in the JIT compiler 110. The JIT compiler 110 may use hardware performance counters 104, available in most modern CPUs.

A second phase of the JIT compilation may start after the native machine code has been executed a configurable amount of time. The JIT compiler 110 may use result from the profiler 408 to identify hot sections, i.e. code sections that have been frequently executed, and compiles these hot sections again. In this second compilation phase the JIT compiler 110 spend more time on optimizing the hot sections and the values from the performance counters 104 may be used to make as efficient decisions as possible of which native machine code to generate.

Figure 3:
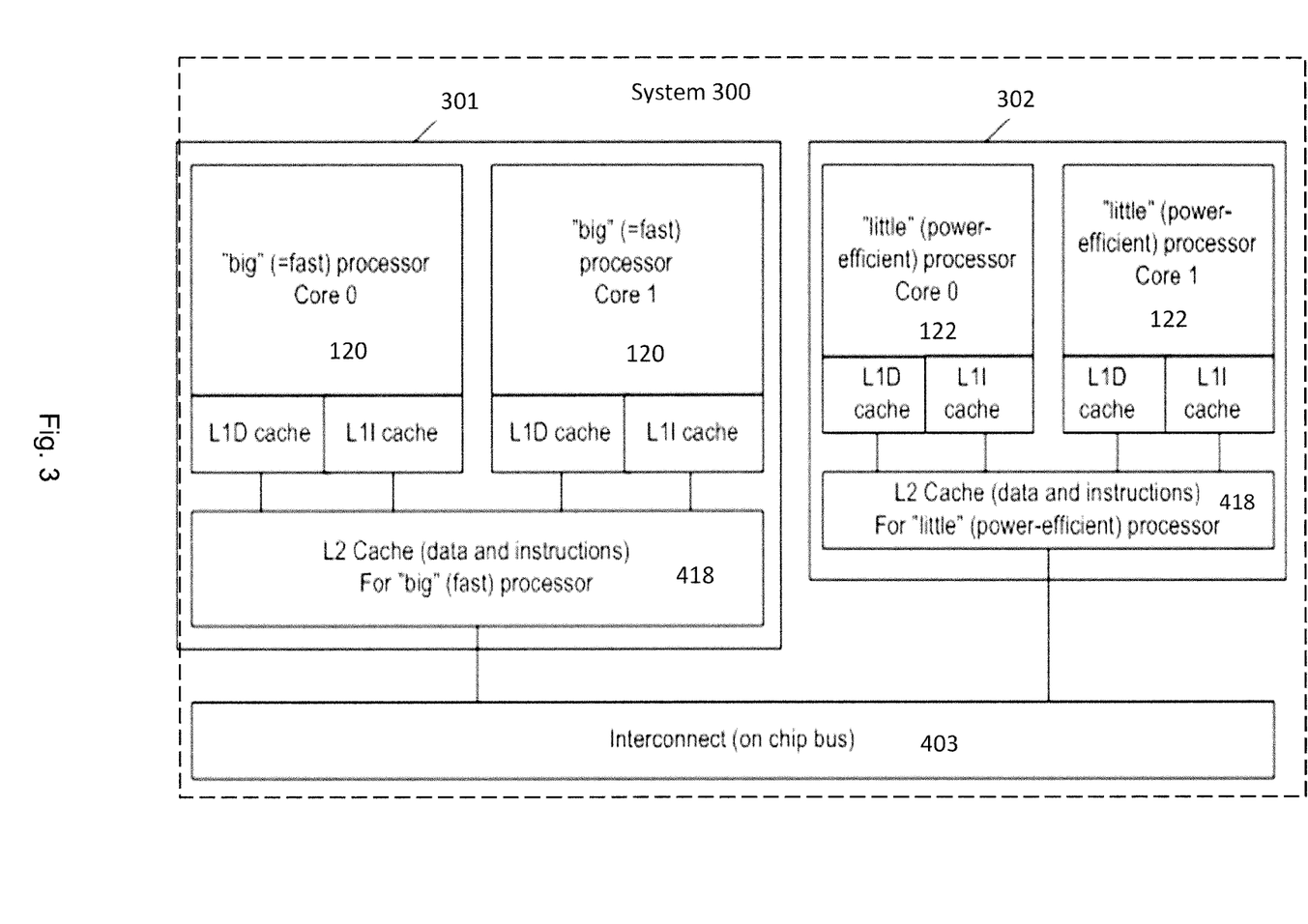
FIG. 3 shows a heterogeneous multi-processor system containing two processor clusters.

The reason that the current processor 120, 122 is important to select the native machine code snippet, is because the different processors 120, 122 may have very different characteristics and a native machine code snippet generated for one processor 120, 122 might not execute optimally on another processor 120, 122 in a heterogeneous multi-processor system 100, 300. An augmented JIT compiler 110 for a heterogeneous multi-processor system 300 will now be described with reference to FIG. 3. In the exemplified embodiment, a heterogeneous multi-processor system 300 with at least two processor clusters 401 and 402 is shown. The number of processor clusters 401, 402 in the heterogeneous multi-processor system 300 is not important. In this example the processor cluster 401 contains two powerful processors 120 delivering high performance. These are paired with two smaller power efficient, but slower, processors 122 located in the processor cluster 402. Both processor clusters 401, 402 are connected to an on chip interconnect 403. As shown in FIG. 4, there is also a Graphic Processing Unit, GPU 416, and a main memory 415 connected to the on chip interconnect 403. A parser 405 takes the input code and performs syntactic analysis into its component parts and create a form of internal representation. The internal representation could for example be an Abstract Syntax Tree, AST. In the exemplified embodiment Hardware IP-x 417 is used to show that there may also be several other IP blocks connected to the main interconnect. SBAG 419 is a traffic spying and statistic reporting block for the on-chip bus 403. The SBAG may measure among other things bus latency and bandwidth measurements. A shared memory buffer 410 for SBAG interconnect bandwidth load measurements is further comprised for sharing data between the SBAG, a Processing Unit 420 and a Code Generator 407 being associated with the Processing Unit 420. The system is power efficient due to for example shorter executing time, possibility to output binary snippets with better utilization of on-chip memory such as registers, caches and TLBs and during run-time selecting the binary snippets that are most well suited for characteristics of the system for a certain point in time compared to conventional methods for compiling and executing code in the JIT-compiler 110.

Both processor clusters comprises Performance Counter Units 404 and 414, which stores the hardware performance counters 104 of the processor. Example of hardware performance counters 104 are, instruction cache misses, data cache misses, Translation Lookaside Buffer, TLB, misses, pipeline stalls, number of taken branches, number of mispredicted branches, number of executed instructions, total number of processor cycles elapsed and number of stalled cycles. The values from the performance counter unit 404 is read and stored in a performance counter First In First Out, FIFO buffer. These performance counter values are then stored in a "Shared memory buffer for performance counters" 409 where the Code Generator 407 and the Processing Unit 420 in the JIT compiler 110 may read them and use them to generate as efficient code as possible in subsequent compilation of hot sections. As an example if the performance counters 104 show higher cache miss ratio than usual, the JIT may try to use narrower instructions when generating the native machine code. For example on an ARM processor the 16 bit thumb instructions may be used instead of the usual 32 bit ARM instructions.

The JIT compiler 110 will tag the different binary snippets generated by the code generator with properties that contain information about which processor 120, 122 in the heterogeneous multi-processor system the native machine code snippet is generated for, and if the native machine code snippet is regarded as extra sensitive for high bandwidth load on the memory. When the JIT compiler 110 generates several native machine code snippets for the same high-level code it will patch the native machine code by a few additional native machine code instructions which read the current processor ID and bandwidth load and branches to the correct native machine code snippet. The native machine code is saved in a code cache 406 where it is executed by one of the processors 120, 122 in the heterogeneous multi-processor system.

Figure 5:
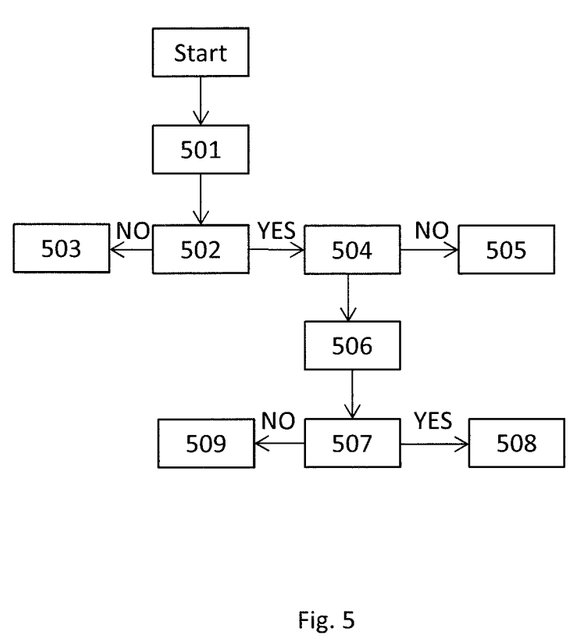
FIG. 5 is a sequence chart that describes execution of native machine code in a JIT compiler.

Turning now to FIG. 5, a sequence chart is shown illustrating an exemplary embodiment. A processor ID is read in action 501. In action 502, it is checked if native machine code snippet does exist for the processor ID. If the answer is NO, in action 503 default native machine code snippet is used, and schedule compilation of new native machine code snippet is performed when cycle budget for the JIT compiler permits this. If the answer is YES, it is checked in action 504 if there are native machine code snippets adapted for different Bus bandwidth loads for this Processor-ID. If not, there is only one native machine code snippet for this processor ID, so this native machine code snippet is used in 505. If there are, bandwidth load is read in action 506. It is checked if bus bandwidth load over limit is defined as high in action 507. If the answer is YES, native machine code snippet for high bus bandwidth load is used in action 508. If the answer is NO, native machine code snippet for low bus bandwidth is used in action 509. Native machine code is executed in a code cache. Improved performance for JIT compiled code running in a virtual machine, which could mean that Android applications, or any other system using a JIT compiler 110, run faster on ST-Ericsson platforms. If applied to the JavaScript engine in a web browser also web applications running in the browser may run more efficiently. Better power efficiency is achieved since, among other advantages, more optimal binary code is executed in the virtual machine.

Although the description above contains many specifics, they should not be construed as limiting but as merely providing illustrations of some presently preferred embodiments. The technology fully encompasses other embodiments which may become apparent to those skilled in the art. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed hereby. Moreover, it is not necessary for a device or method to address each and every problem sought to be solved by the described technology for it to be encompassed hereby.

When using the word "comprise" or "comprising" it shall be interpreted as non-limiting, in the meaning of consist at least of.

When using the word action/actions it shall be interpreted broadly and not to imply that the actions have to be carried out in the order mentioned. Instead, the actions may be carried out in any suitable order other than the order mentioned. Further, some action/actions may be optional.

The embodiments herein are not limited to the above described examples. Various alternatives, modifications and equivalents may be used. Therefore, this disclosure should not be limited to the specific form set forth herein. This disclosure is limited only by the appended claims and other embodiments than the mentioned above are equally possible within the scope of the claims.

The invention claimed is:

1. A method in a heterogeneous multiprocessor system comprising a Just-In-Time, JIT, compiler for compiling code, and comprising a plurality of processors for executing code, the method comprising:
    compiling one snippet of input code to generate one or more alternative compiled code snippets, wherein each of the one or more compiled code snippets corresponds to the one snippet of input code,
    tagging the one or more alternative compiled code snippets with respective one or more snippet specific characteristics, wherein a first of the one or more alternative complied code snippets is tagged for a low bandwidth load on a bus of the heterogeneous multiprocessor system and a second of the one or more alternative complied code snippets is tagged for a high bandwidth load on the bus;
    determining a bandwidth load on the bus;
    selecting the first or second of the one or more alternative compiled code snippets from the one or more alternative compiled code snippets based on said snippet specific characteristics and the determined bandwidth load on the bus, and
    executing at least the selected one of the first or second alternative compiled code snippets on one or more of the plurality of processors; while executing the selected one of the first or second alternative compiled code snippets, gathering run-time data, the gathered run-time data is tagged for which processor in the heterogeneous multiprocessor system it is related to.

2. Method according to claim 1, further comprising:
    further tagging the selected one of the first or second alternative compiled code snippets with the gathered run-time data,
    re-compiling the selected one of the first or second alternative compiled code snippets based on the tagging or further tagging, and the runtime data to generate at least two alternative re-compiled code snippets,
    re-selecting one or more of the at least two alternative re-compiled code snippets based on said snippet specific characteristics and on said gathered run-time data, and
    re-executing the one or more of the re-selected at least two alternative compiled code snippets on one or more of said plurality of processors.

3. Method according to claim 1, in the action executing, further comprising: identifying one or more code sections executed a plurality of times.

4. Method according to claim 1, wherein, in any of the selection actions, selection is further based on which processor the code currently executes on.

5. A method in a Just-In-Time, JIT, compiler for compiling code for a heterogeneous multiprocessor system comprising a plurality of processors, the JIT compiler being associated with the heterogeneous multiprocessor system, the method comprising:
    compiling one snippet of input code to generate one or more alternative compiled code snippets are generated for the snippet of input code, and wherein each respective of the one or more compiled code snippets corresponds to the one snippet of input code,
    tagging the one or more alternative compiled code snippets with respective one or more snippet specific characteristics, wherein a first of the one or more alternative complied code snippets is tagged for a low bandwidth load on a bus of the heterogeneous multiprocessor system and a second of the one or more alternative complied code snippets is tagged for a high bandwidth load on the bus;
    determining a bandwidth load on the bus; and
    selecting the first or second of the one or more alternative compiled code snippets to be executed from the one or more alternative compiled code snippets, based on said snippet specific characteristics and the determined bandwidth load on the bus,
    wherein while the selected one of the first or second alternative compiled code snippets is executing run-time data is gathered, and the gathered run-time data is tagged for which processor in the heterogeneous multiprocessor system it is related to.

6. Method according to claim 5, further comprising:
    further tagging the selected one of the first or second alternative compiled code snippets with gathered run-time data after the code has been executed on one of the processors,
    re-compiling the selected one of the first or second alternative compiled code snippets compiled code snippets based on the tagging or further tagging to generate at least two alternative re-compiled code snippets, and re-selecting one or more of the at least two alternative re-compiled code snippets to be executed based on said snippet specific characteristics and on said gathered run-time data.

7. Method according to claim 5, wherein, in any of the selection actions, selection is further based on which processor the code currently executes on.

8. A non-transitory computer readable storage medium comprising a Just-In-Time, JIT compiler compiling code for a heterogeneous multiprocessor system, the JIT compiler is associated with the heterogeneous multiprocessor system comprising a plurality of processors, wherein when the JIT compiler is executed the JIT compiler:
compiles one snippet of input code to generate one or more alternative compiled code snippets, wherein each of the one or more compiled code snippets corresponds to the one snippet of input code,
tags the one or more alternative compiled code snippets with one or more snippet specific characteristics, wherein a first of the one or more alternative complied code snippets is tagged for a low bandwidth load on a bus of the heterogeneous multiprocessor system and a second of the one or more alternative complied code snippets is tagged for a high bandwidth load on the bus;
determining a bandwidth load on the bus;
selects the first or second of the one or more alternative compiled code snippets from the one or more alternative compiled code snippets based on said snippet specific characteristics and the determined bandwidth load on the bus, and
executes at least the selected one of the first or second alternative compiled code snippets on one or more of the plurality of processors; while executing the selected one of the first or second alternative compiled code snippets, gathering run-time data, where the gathered run-time data is tagged for which processor in the heterogeneous multiprocessor system it is related to.

9. Non-transitory computer readable storage medium according to claim 8, wherein when the JIT compiler is executed the JIT compiler:
further tags the selected one of the first or second alternative compiled code snippets with the gathered run-time data,
re-compiles the selected one of the first or second alternative compiled code snippets based on the tagging, the further tagging, and the runtime data by use of one or more hardware performance counters that count hardware architecture events to generate at least two alternative re-compiled code snippets,
selects one or more of the at least two alternative re-compiled code snippets based on said snippet specific characteristics and on said gathered run-time data, and
re-executes the one or more of the re-selected at least two alternative compiled code snippets on one or more of said plurality of processors.

10. Non-transitory computer readable storage medium according to claim 8, wherein when the JIT compiler is executed the JIT compiler tags each of the identified one or more code sections executed a plurality of times with a respective identity identifying which one out of the plurality of processors it is generated for.

11. Non-transitory computer readable storage medium according to claim 8, wherein when the JIT compiler is executed the JIT compiler selects code snippet based on which processor that the code currently executes on.

12. A heterogeneous multiprocessor system comprising a Just-In-Time, JIT, compiler for compiling code, and comprising a plurality of processors, the system being adapted to:
compile one snippet of input code to generate one or more alternative compiled code snippets, wherein each of the one or more compiled code snippets corresponds to the one snippet of input code,
tag the one or more alternative compiled code snippets with one or more snippet specific characteristics, wherein a first of the one or more alternative complied code snippets is tagged for a low bandwidth load on a bus of the heterogeneous multiprocessor system and a second of the one or more alternative complied code snippets is tagged for a high bandwidth load on the bus;
determining a bandwidth load on the bus;
select the first or second of the one or more alternative compiled code snippets from the one or more alternative compiled code snippets, based on said snippet specific characteristics and the determined bandwidth load on the bus, and
execute at least the selected one of the first or second alternative compiled code snippets on one or more of the plurality of processors; while executing the selected one of the first or second alternative compiled code snippets, gathering run-time data, wherein the gathered run-time data is tagged for which processor in the heterogeneous multiprocessor system it is related to,
wherein the system further comprises one or more hardware performance counters that count hardware architecture events, and wherein the system is further adapted to gather run-time data using the one or more hardware performance counters.

13. Heterogeneous multiprocessor system according to claim 12, further adapted to:
further tag the selected one of the first or second alternative executed compiled code snippets with the gathered run-time data,
re-compile the selected one of the first or second alternative compiled code snippets based on the tagging, the further tagging, and the runtime data to generate at least two alternative re-compiled code snippets,
re-select one or more of the at least two alternative re-compiled code snippets based on said snippet specific characteristics and on said gathered run-time data, and
re-execute the one or more of the re-selected at least two alternative compiled code snippets on one or more of said plurality of processors.

14. Heterogeneous multiprocessor system according to claim 12, further adapted to tag each of the identified one or more code sections executed a plurality of times with a respective identity identifying which one out of the plurality of processors it is generated for.

15. Heterogeneous multiprocessor system according to claim 12, further adapted to select code snippet based on which processor that the code currently executes on.

16. Method according to claim 1, wherein the run-time data is gathered at least using one or more performance counters that count hardware architecture events, which are at least one of instruction cache misses, data cache misses, Translation Lookaside Buffer, TLB, misses, pipeline stalls, number of taken branches, number of mispredicted branches, number of executed instructions, total number of processor cycles elapsed, and number of stalled cycles.

17. Method according to claim 5, wherein the run-time data is gathered at least using one or more performance counters that count hardware architecture events, which are at least one of instruction cache misses, data cache misses, Translation Lookaside Buffer, TLB, misses, pipeline stalls, number of taken branches, number of mispredicted branches, number of executed instructions, total number of processor cycles elapsed, and number of stalled cycles.

18. Non-transitory computer readable storage medium according to claim 8, wherein the run-time data is gathered at least using one or more performance counters that count hardware architecture events, which are at least one of instruction cache misses, data cache misses, Translation Lookaside Buffer, TLB, misses, pipeline stalls, number of taken branches, number of mispredicted branches, number of executed instructions, total number of processor cycles elapsed, and number of stalled cycles.

19. Heterogeneous multiprocessor system according to claim 12, wherein the run-time data is gathered at least using one or more performance counters that count hardware architecture events, which are at least one of instruction cache misses, data cache misses, Translation Lookaside Buffer, TLB, misses, pipeline stalls, number of taken branches, number of mispredicted branches, number of executed instructions, total number of processor cycles elapsed, and number of stalled cycles.

* * * * *